United States Patent [19]

Strömblad

[11] 4,299,439
[45] Nov. 10, 1981

[54] INTERMEDIATE TUBE AND ELEVATING MECHANISM FOR A MICROSCOPE

[75] Inventor: Gunnar Strömblad, Göteborg, Sweden

[73] Assignee: Carl Zeiss-Stiftung, Oberkochen, Fed. Rep. of Germany

[21] Appl. No.: 97,846

[22] Filed: Nov. 27, 1979

[30] Foreign Application Priority Data

Nov. 28, 1978 [SE] Sweden .................. 7812265

[51] Int. Cl.³ ........................................... G02B 21/00
[52] U.S. Cl. ........................................ 350/49; 350/54; 350/85
[58] Field of Search .................................. 350/31–36, 350/48–51, 54, 85

[56] References Cited

U.S. PATENT DOCUMENTS

| | | | |
|---|---|---|---|
| 1,962,834 | 6/1934 | Patterson | 350/49 X |
| 2,138,665 | 11/1938 | Ott | 350/49 |
| 2,439,526 | 4/1948 | Ott | 350/49 |
| 2,453,257 | 11/1948 | Ott | 350/49 |
| 4,175,826 | 11/1979 | Blaha et al. | 350/36 |

FOREIGN PATENT DOCUMENTS

| | | | |
|---|---|---|---|
| 2654778 | 6/1978 | Fed. Rep. of Germany | 350/36 |
| 713243 | 8/1954 | United Kingdom | 350/35 |

Primary Examiner—John K. Corbin
Assistant Examiner—Matthew W. Koren
Attorney, Agent, or Firm—Hopgood, Calimafde, Kalil, Blaustein & Judlowe

[57] ABSTRACT

The invention contemplates an intermediate tube-attachment accessory, which may be interposed between standard parts of a conventional microscope, namely, between the objective turret or other mount, and the viewing tube, whether monocular or binocular. The attachment accessory includes a first or base part adapted to fit the objective mount and a second or swing-arm part adapted to receive a viewing tube fitted thereto. The swing action of the attachment is about a horizontal axis, and a mirror on the swing axis is geared to tilt at half the angle of adjusted swing elevation. Optical elements within the attachment perform an image-inverting function which enables erect image viewing, regardless of the adjusted angle of swing.

6 Claims, 5 Drawing Figures

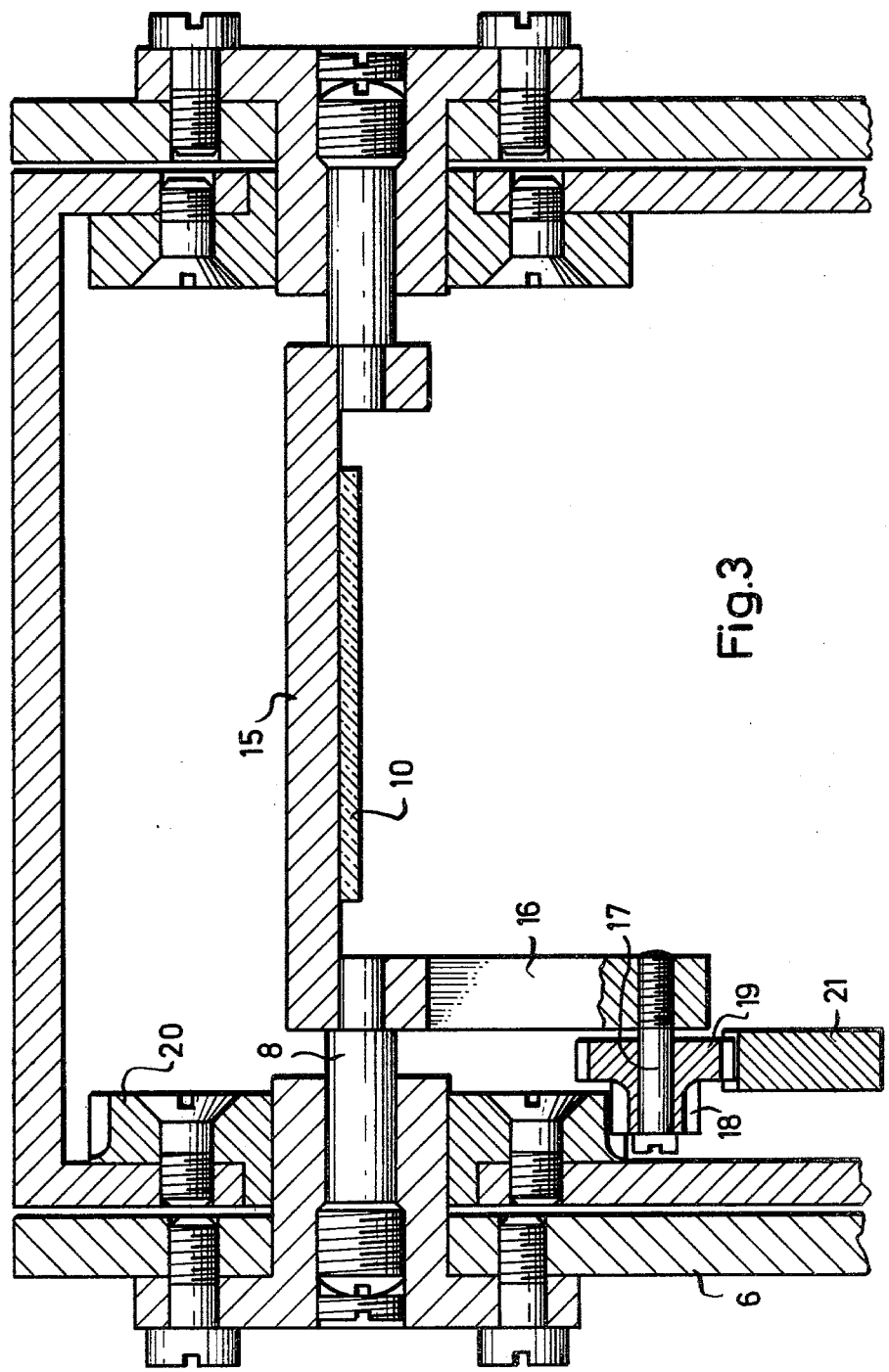

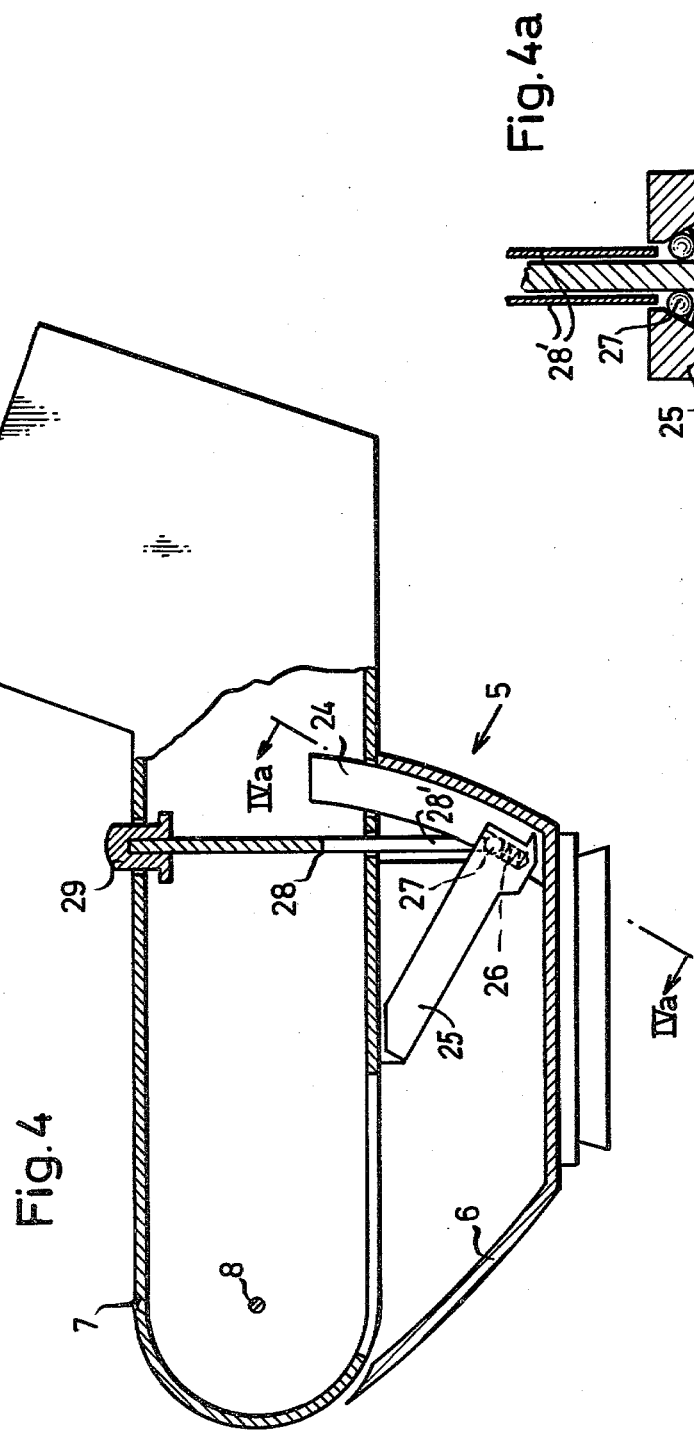

INTERMEDIATE TUBE AND ELEVATING MECHANISM FOR A MICROSCOPE

BACKGROUND OF THE INVENTION

The present invention relates to a device for elevational displacement of the eyepiece of a microscope having a removable tube.

Most of the known conventional microscopes have a removable tube having a length of about 16 cm. The objectives used are corrected for this tube length, which is inter alia also a factor in the stated magnification of the microscope. And in any new designs, this length must at all times be recognized if importance is placed on compatibility with existing accessories.

Larger research microscopes, to be sure, frequently have a greater tube length, a different length of for instance 20-25 cm, obtained by means of an auxiliary lens system. But there is an inherent accompanying increase, by a factor of approximately 1.25× to 1.5×, in image scale of the objectives used, resulting in an undesired reduction in the size of the visual field.

In ordinary conventional microscopes, the removable tube, which is frequently also developed as a binocular tube, is arranged in such manner that the viewer looks into the eyepeices inserted therein at a viewing-aspect elevation of between 30° and 45° to the horizontal, since in the normal working position the view is, after all, in a seated position, in front of the microscope, which stands on a table. Oblique observation within this angular range is therefore adapted to the ordinary height of the body of the observer.

In recent years, increasing specialization of laboratory activities towards fewer fields of work has had the result that certain groups of persons work in front of the microscope in a sitting position for the greater part of the day. With longer continuous work on the microscope, the shortcomings of traditional mechanical microscope constructions have become increasingly more evident. Many users assume an unnatural, uncomfortable position and, in the further circumstance of monotony of the work, cramps, headaches, and pains in the neck, back and arms are the result. Because of the mechanical tube length of 16 cm, the microscope itself does not have the dimensions which are best adapted to the dimensions of the human body. The microscopes are too short, i.e., the distance between eyepiece and tabletop does not agree with the distance which should be present between the eye and the arm which is resting on the tabletop. The operating parts of the microscope stand are arranged too close to the body, and the viewer is always too tall as compared with the microscope; he must either incline his head downward if his arms are to rest comfortably on the tabletop, or else he must sit too low in order to be able to direct his eye properly onto the eyepiece, and in the latter case the tabletop is so high that he is forced to sit with his shoulders and arms cramped. Short persons therefore have the least difficulties, while the difficulties are greater for persons of average and greater-than-average height.

By suitably shaping the furniture, and in particular the table, it has been attempted to improve the working position of the microscope user. However, it has not been possible thereby to significantly affect the sitting position.

The anatomical shape of the human body makes it desirable to arrange the eyepieces of a microscope at such a distance away from the remaining part as to correspond to the distance between the eyes and the hands of the viewer when the latter is seated in an erect working position in front of the microscope. Furthermore, the eyepieces should be adjustable in height so that they can always be adapted to the position of the body of the viewer, which position changes during the course of prolonged working hours.

U.S. Pat. No. 2,439,526 discloses a microscope which contains an eyepiece with variable observation angle. Although this construction provides a rather large range of adjustable observation angles, it does not permit any significant possibility of vertical adjustment due to its short swing lever, and it has the above-described disadvantage of the anatomically unfavorable short structure.

German patent application No. 2,654,778, describes a stereoscopic tube for an operation microscope with variable observation angle, the instrument being designed specifically for observation close to the object; but this instrument also has the above-noted disadvantage. The microscope tube is kept extremely short by multiple bending of the ray path in order to assist the viewer, in assumption of a relaxed working position; however, in the normal case, the viewer is working not on the microscope, but on the patient.

BRIEF STATEMENT OF THE INVENTION

The object of the present invention is to provide a device which can be used as an optional attachment to existing removable-tube microscopes, such device effecting a displacement of the eyepieces in the direction towards the view and enabling adjustment of the working height of the eyepieces.

In accordance with the present invention this object is realized by an intermediate attachment which can be inserted between objective turret and microscope tube and which consists of two parts which are swingable with respect to each other about a horizontal axis. These parts comprise a mirror which is inclined by half the angle of swing about the swing axis of the two parts, and an optical system forming an intermediate image; the optical system also images the intermediate image of the object (produced by the objective) at a predetermined distance from the first intermediate image, which predetermined distance corresponds to the tube length of the intermediate piece. It can readily be seen that by these means the microscope tube is lengthened, and, due to the relatively long extent of the swing lever (represented by the microscope tube of the intermediate piece) a relatively great range of adjustable height or elevation displacement of the eyepieces is assured.

The construction to be described also has a number of other advantages. Conventional microscopes to which the intermediate attachment of the invention is applicable, conventionally produce an inverted intermediate image. This image-reversal is very disturbing since, for instance, the pathologist practically always shifts the preparation manually on the microscope stage, and he is forced to imagine it inverted when he seeks sections thereof under the microscope. This image-reversal also affords difficulties for persons who are working with a mechanical stage, and who attempt to push the preparation in the correct direction without first of all, shortly before, observing the preparation in the eyepiece, again looking at the table. In accordance with the present invention, the intermediate image is imaged once again and thus erected again, so that the viewer sees an erect image of the object, i.e., as an unreversed image.

Another disadvantage of the previously known microscopes is that the intermediate image of the object is produced at a place which is poorly accessible, namely in the eyepieces. For measurement of details of the object, e.g., the counting of cells, etc., different types of ocular reticle are selectively available for insertion into the intermediate image plane, so that the reticle and the object can be observed simulataneously. In the case of binocular microscopes, one eye sees only the object while the other eye sees the same object with reticle. This asymmetry of the images of the two eyes is fatiguing to the brain and difficult for it to accept. It is desirable to achieve the result that identical images be offered to both eyes, i.e., that both object and reticle can be seen in both eyepieces. However, one cannot insert one reticle into both eyepieces, since it is essential that each image have the reticle at exactly the same place in its image of the object field. The smallest deviations produce a stereoscopic effect which is equivalent to an apparent displacement of the reticle out of the plane of the object, so that measuring or counting is disturbed. In the device in accordance with the invention, a first intermediate image of the object is now produced before it is divided into two ray paths in a binocular tube. One can therefore introduce reticles, arrows and the like in the inventive intermediate attachment and thus obtain the result that identical images are presented to both eyes via the binocular tube.

It is advisable to arrange the swing axis of the two parts of the intermediate attachment on the side facing away from the viewer, in order to obtain the longest possible swing lever and thus the greatest possible vertical adjustability of the eyepieces. To assure constant effective tube length, for ray treatment within the intermediate attachment and throughout the swing range of adjustable elevation, a prism is employed in conjunction with the mirror; and the prism may be of the kind used for ray deflection is removable tubes of conventional microscopes.

DETAILED DESCRIPTION OF A PREFERRED EMBODIMENT

The invention will be described in further detail below with reference to the accompanying drawings, in which:

FIG. 3 is another fragmentary sectional view of the mechanism of FIG. 2, the section being taken at the alignment III—III of FIG. 2;

FIG. 4 is a simplified fragmentary view from the aspect of FIG. 1 to show an automatic clamping device for the intermediate attachment of FIG. 1; and FIG. 4a is a fragmentary sectional view, taken at IVa—IVa in FIG. 4.

Figure 1:
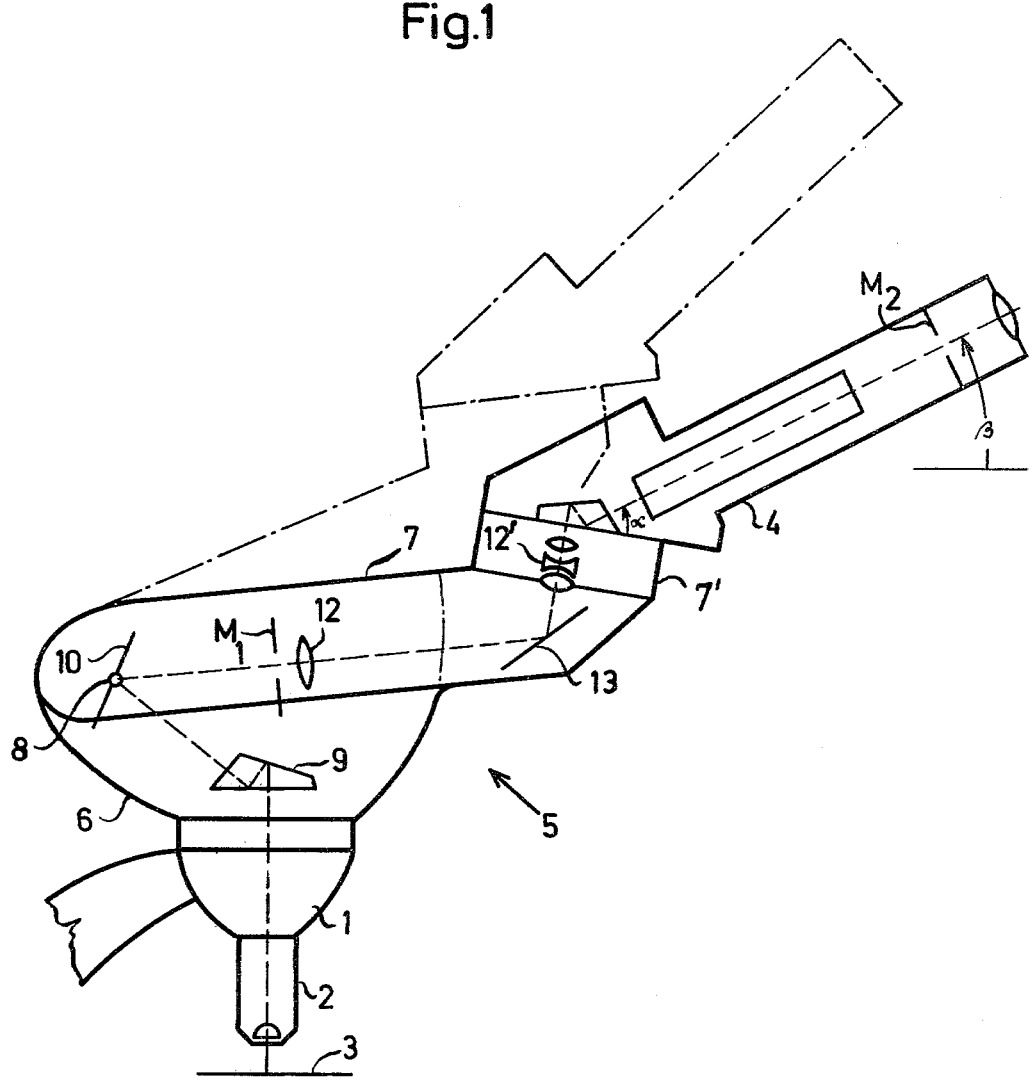
FIG. 1 is a simplified view in side elevation of an intermediate attachment of the invention, installed between an objective turret and a microscope tube.

In FIG. 1, a microscope with an objective turret 1 supports an objective 2 on a vertical axis of alignment over a specimen stage 3. The microscope has a preferably binocular viewing tube 4 with an oblique base surface, in this case having an inclination angle α of 30°, with respect to viewing-axis alignment; in the conventional microscope, this base surface is mounted directly on the objective turret. In accordance with the invention, an intermediate attachment 5 is interposed between the objective turret 1 and the tube 4; attachment 5 consists of two swingable parts connected to each other, namely, a lower or base part 6 and an upper or swing-arm part 7. The lower part 6 includes an offset portion on the remote side of the vertical optical axis, i.e., on the side away from the user, and this offset portion establishes the articulation axis 8 for the swing arm 7; thus, arm 7 extends from axis 8 back over the lower part 6 and further in the direction towards the viewer.

At its free end, the arm 7 bears a mounting adapter 7' for attachment of the base end of the removable tube 4. In the lower part 6, and within the ray path of the objective 2, there is furthermore inserted a reflecting prism 9 which directs light rays from the objective 2 to a tiltable mirror 10 that is positioned on the horizontal swing axis 8. By means of the mechanism shown in FIGS. 2 and 3, mirror 10 is at all times tilt-coordinated, to the extent of one-half the angle of swing of the arm 7, in such manner that the ray path extends from the specimen via prism 9 to mirror 10 and thence to tube 4; thus, the ray path is in all cases contained and properly aligned in the swing arm 7.

The first intermediate image plane is located at the point in the swing arm 7 designated by an aperture M1. An optical system, which can be best referred to as an optical system imaging in a scale of $-1$, comprises lenses 12-12' and a mirror 13, whereby the inverted first intermediate image produced at the aperture M1 by the objective 2 is again imaged and is thus erected at the plane of an aperture M2 in the eyepiece. This optical system 12, 12', 13 is located in the ray path between aperture M1 and the tube-mounting adapter 7' in the swing arm 7.

The tube 4 is shown in the drawing with an inclination angle α of 30°; of course, tubes having different fixed inclination angles can also be used, preference being indicated for an angle of 45°. In order to permit a sufficient range of adjustment for work with the microscope for persons of normal height, the viewing angle β of elevation above the horizontal should lie between 20° and 45°. For the herein described intermediate attachment 5, the tube-mounting surface of adapter 7' is inclined at $-10°$ for the lowest position of arm 7, and a 25° upward swing is selectively available, to 15° above the horizontal, thus being more suitable for persons of lesser height.

Figure 2:
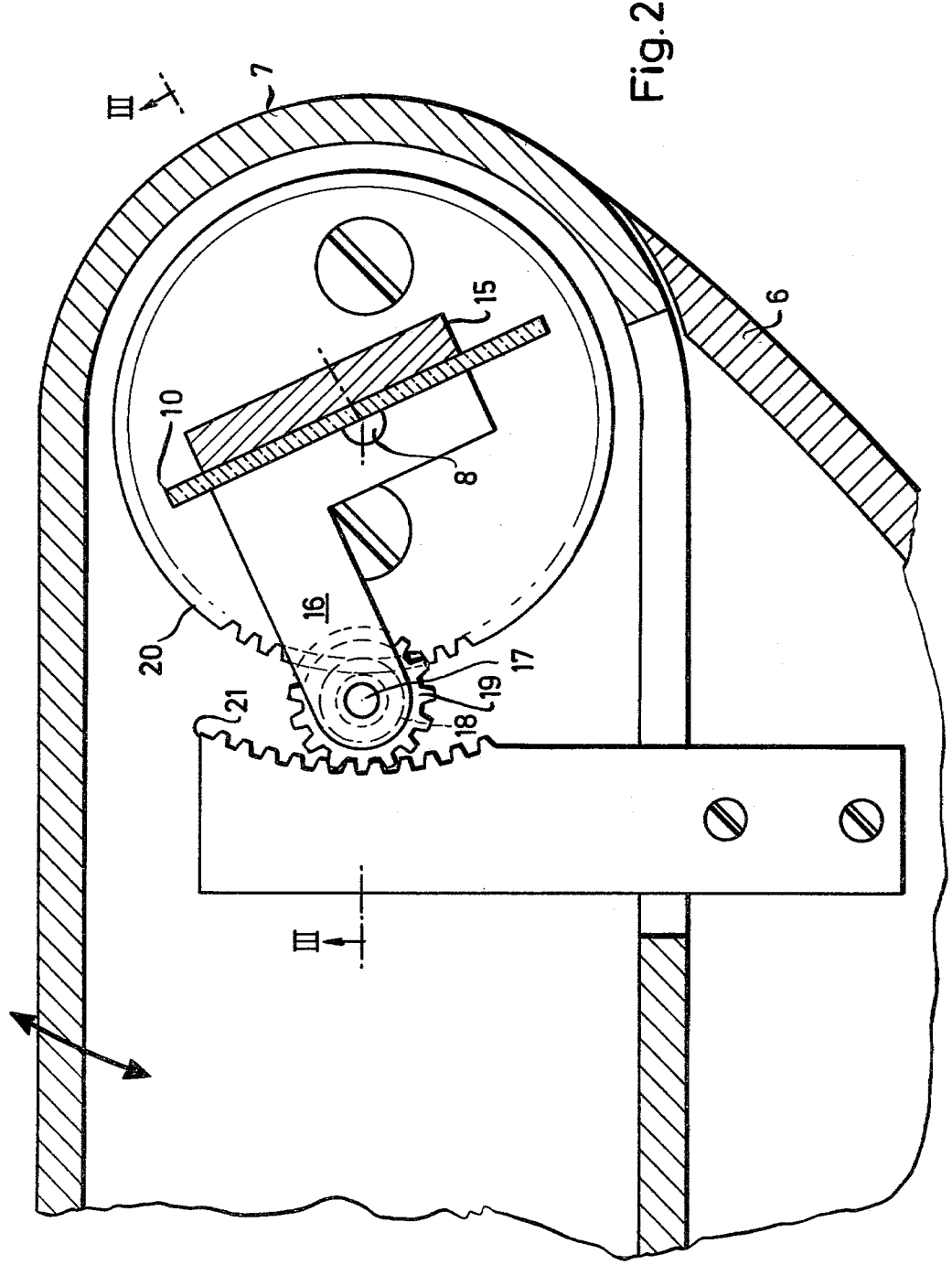
FIG. 2 is an enlarged fragmentary sectional view, showing internal detail, for mechanism used to control deflection-mirror angle in the attachment of FIG. 1, the viewing aspect being from the side opposite to that of FIG. 1.

As already mentioned, the mirror 10 should tilt around the swing-articulation axis 8 by an amount equal to half the angle of the swing of the arm 7. Various means are available to achieve this divide-by-two relation, and a mechanical half-angle control is shown in FIGS. 2 and 3, wherein a shaft 8 defines the articulation (swing) axis. A mount 15 for the mirror 10 is carried by shaft 8. Mount 15 includes a crank arm 16 extending normal to the plane of the mirror and, at its free end a shaft 17 is mounted for idler rotational support of two pinions 18, 19, rigidly connected to each other. Of these pinions, the smaller one 18 is in engagement with a gear 20 which is fixed to the swing arm 7. The other pinion 19 is in engagement with a ring-gear segment 21 which is fixed to the lower part 6 of the intermediate attachment 5. When arm 7 is elevated about the axis 8 and relative to the lower part 6, gear 20 drives pinion 18 and thus also rotates pinion 19, and both pinions move along the gear segment 21, whereby arm 16 and thus the mirror mount 15 are tilted. By a suitable selection of the numbers of teeth on the respective gears, it will be understood that mirror 10 may be caused to tilt with half the angle of elevation displacement of swing of the arm 7.

The swing arm 7 can be locked in its adjusted angular position with respect to the lower part 6 of the intermediate piece 5 by means of a mechanism which operates more or less automatically. The clamping device shown in FIGS. 4 and 4a consists of a slide rail 24, arcuate about axis 8 and fastened to the lower part 6, and a fork 25 carried by the swing arm 7 straddles rail 24 at all times. Fork 25 contains two balls 27 which are resiliently supported in bores 26, the bores 26 being so arranged that balls 27 are pressed obliquely upward against rail 24. With this arrangement, an easy lifting of the swing arm 7 is possible; however, upon loading from above, balls 27 are wedged between the parts 24, 25 and thus lock the swing arm 7. In order to relieve the clamp, an actuator 28 having a push-button upper end 29 and a forked lower end 28' may be depressed by the viewer, to drive balls 27 from their wedged position.

What is claimed is:

1. A viewing accessory for attachment to a microscope having an objective mount and viewing-tube structure removably attachable to said mount and of length to accommodate an intermediate image plane, said accessory comprising a base fitting having means for attachment to the objective mount, and a tubular swing arm one end of which is connected to said base fitting for articulation about a horizontal axis and the other end of which includes means to removably mount the viewing-tube structure, thus interposing said accessory between the objective mount and the viewing-tube structure, optical elements within said swing arm and including a mirror on and tiltable about the swing axis for assuring constant optical-axis alignment and positioning within the swing arm, mechanism reacting between said accessory parts at offset from the swing axis for assuring a divide-by-two relation between angular-swing displacement of said parts and angular-tilt displacement of said mirror, and said optical elements including lens means to interpose an additional intermediate-image plane in the ray path between the objective and viewing ends of the microscope, said interposed intermediate-image plane being in addition to the first-mentioned intermediate-image plane, whereby an erect image is viewable over a range of elevation-angle adjustment of said swing-arm mounted viewing-tube structure.

2. The microscope accessory of claim 1, in which the swing axis is at radial offset from the optical axis of the objective mount, and in which reflector means fixedly mounted within said base part and on the objective-mount axis is oriented to direct objective-axis alignment to said tiltable mirror.

3. The microscope accessory of claim 2, in which said reflector means is a prism.

4. The microscope accessory of claim 1, in which the removably attachable mounting of the objective mount and viewing-tube structure is at a fitting-plane surface that is normal to local passage of the optical axis therethrough, and in which the objective-attachment and tube-attachment ends of said accessory are characterized by fitting-plane surfaces that are respectively normal to local passage of the optical axis therethrough, the fitting-plane surfaces of said accessory being inclined from parallelism to an extent which is less than the range of elevational swing of said swing arm.

5. The microscope accessory of claim 4, in which said inclination from parallelism is substantially one half the angular range of swing of said swing arm.

6. The microscope accessory of claim 1, characterized by clamping means for locking said swing arm to said base fitting in desired angular position about said horizontal axis of articulation.

* * * * *